United States Patent  [15] 3,658,426
Vyce  [45] Apr. 25, 1972

[54] ALIGNMENT TELESCOPE

[72] Inventor: Joseph Richard Vyce, Lexington, Mass.

[73] Assignee: Itek Corporation, Lexington, Mass.

[22] Filed: Sept. 11, 1968

[21] Appl. No.: 758,939

[52] U.S. Cl. .................................. 356/152, 356/142
[51] Int. Cl. .......................................... G01b 11/26
[58] Field of Search ................................ 356/152, 141

[56] References Cited

UNITED STATES PATENTS

| | | | |
|---|---|---|---|
| 3,502,414 | 3/1970 | Kreckel | 356/152 |
| 3,317,739 | 5/1967 | Larraburu | 356/152 |
| 3,241,430 | 3/1966 | Kulick | 356/152 |
| 3,218,913 | 11/1965 | Kaestner | 356/152 |
| 2,998,746 | 9/1961 | Gievers | 356/152 |

Primary Examiner—Richard A. Farley
Assistant Examiner—Joseph G. Baxter
Attorney—Homer O. Blair, Robert L. Nathans and John M. Brandt

[57] ABSTRACT

An electro-optical alignment telescope is disclosed which is adapted to detect lateral displacement of an object having a retroreflector mounted thereon by imaging an illuminated nose portion of a truncated prism on such reflector and imaging back the reflected light on the prism. Light reflected from the sides of the prism is detected and measured to provide information on the amount and direction of lateral displacement.

13 Claims, 3 Drawing Figures

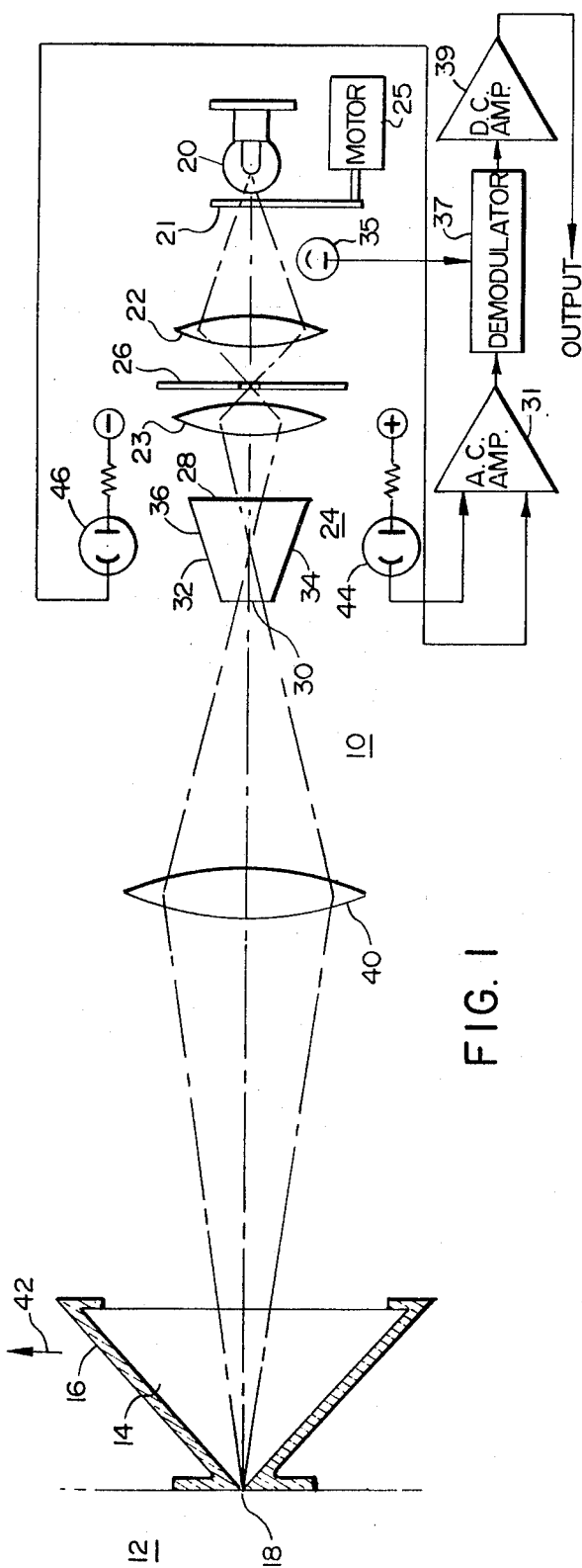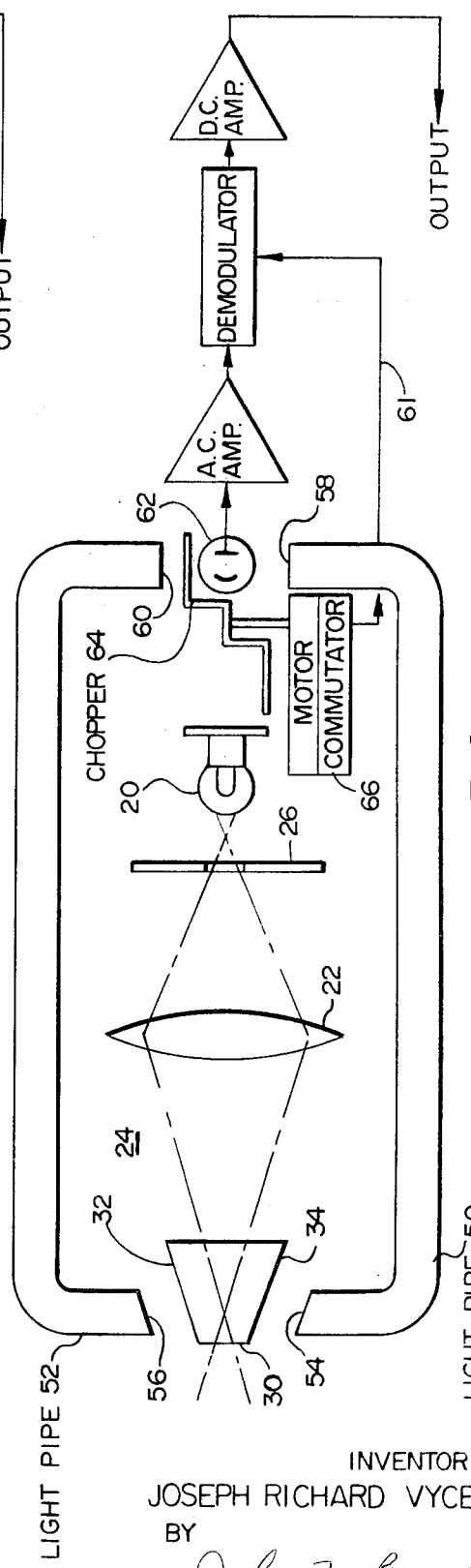
FIG. 1
FIG. 2
INVENTOR
JOSEPH RICHARD VYCE
BY
John M Brandt
ATTORNEY

INVENTOR
JOSEPH RICHARD VYCE
BY
ATTORNEY

ALIGNMENT TELESCOPE

BACKGROUND OF THE INVENTION

1. Field of the Invention

The invention is related to the detection of small lateral displacements and particularly to highly accurate apparatus for measuring the displacement of one object relative to another. It is further related to measurement devices operating on the principle of photoelectric detection of reflected light sources. The resulting measurements may be used to automatically control the alignment of the subject object by employing servomechanisms and the like.

2. Description of the Prior Art

Alignment mechanisms utilizing light beams which are divided and reflected by prisms and then detected by associated photoelectric devices are known in the prior art. Specifically, U.S. Pat. No. 2,703,505, issued to J.A. Senn, discloses a device in which a light beam is projected on a reflecting pyramid prism, divided thereby, and the corresponding reflected components detected by phototubes and measured in a variety of ways. In this approach it is critical that the axis of the prism receiving the projected beam be angularly aligned parallel with the beam source or reference point before an accurate lateral displacement measurement may be made. As will become clear from the description below, the present invention distinguishes over the prior art by providing a mechanism in which the projected beam is imaged back on itself by a retroreflector, thus eliminating for at least one axis the sensitive problem of inaccurate results generated by angular misalignment. Additionally, by the use of a trihedral or alternatively a catseye reflector, displacement in two dimensions may be measured simultaneously, and adverse effects ordinarily encountered from angular misalignment about any axis are completely eliminated.

Further, by locating the source and detecting mechanisms at one location in the manner of the present invention the object to be aligned becomes passive; that is, is freed from encumbrances of instrumentation, electrical connections, and the like.

Although apparatus is known in which the projected beam is reflected from a subject object and then is detected at another position, the invention further distinguishes over the prior art in the field of lateral displacement measurement by incorporating the light source and detecting apparatus at the same location. Thus, problems of compound axial alignment which are present in devices employing light beam source and detecting apparatus at locations separated from the subject object and separated from each other are eliminated by the disclosed invention.

SUMMARY OF THE INVENTION

In accordance with one embodiment of the invention, apparatus is provided which projects a light beam through the nose of a truncated prism, images that beam at a retroreflector located on the subject object and detects lateral displacement from axial coincidence between the retroreflector and the prism by examining the reflected beam. The nodal point of the retroreflector is located exactly at the point on the object to be centered. When the subject object is perfectly aligned, the nose image is imaged back on itself such that either no light is reflected from the sides of the prism or alternatively an equal amount is reflected from two opposed sides resulting in a null condition. Deviation from axial coincidence is determined by the shift in position of the nose image which is reflected back through the optical system and a larger amount of light is reflected to one detector than to the other from the sides of the prism.

The invention is further characterized by the use of a modulated light source and associated electronics which improves accuracy due to the lowering of noise effects.

DESCRIPTION OF THE DRAWINGS

The foregoing objects and advantages of the present invention will become more fully apparent from the following detailed description of the exemplifying embodying apparatus shown in the accompanying drawings in which:

FIG. 1 is an overall schematic diagram of the alignment telescope;

FIG. 2 is a schematic diagram of an alternative arrangement of detector components used in the apparatus of FIG. 1.

DESCRIPTION OF THE PREFERRED EMBODIMENT

Figure 3:
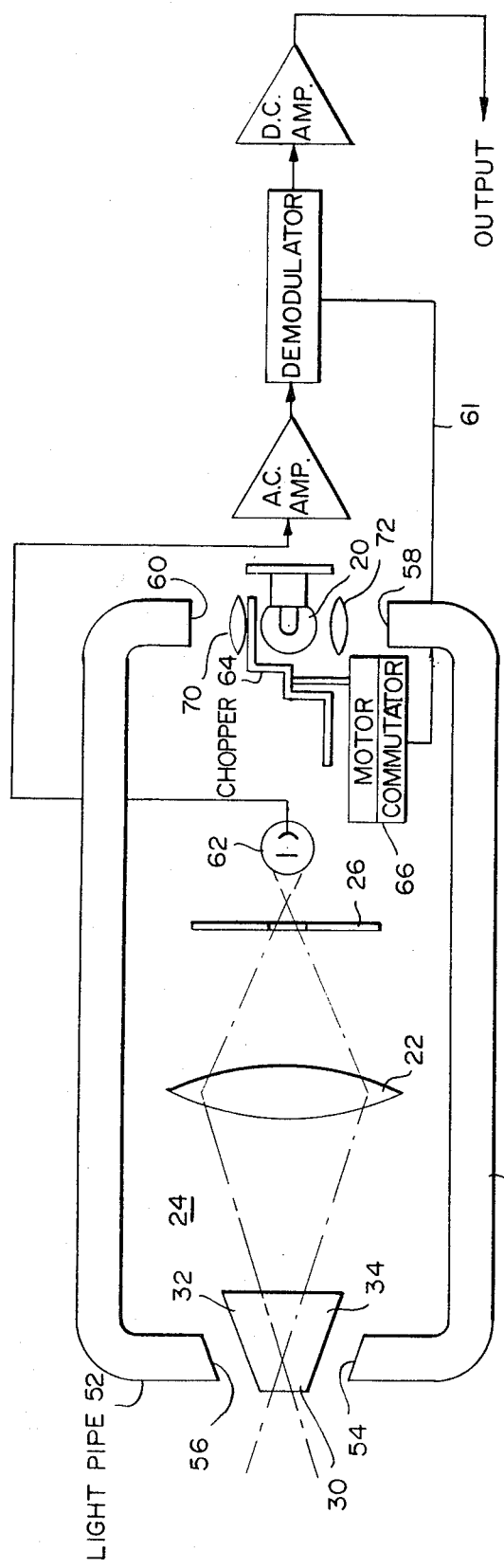
FIG. 3 is an alternative arrangement of the apparatus of FIG. 2.

Referring now to FIG. 1, there is shown an alignment telescope designated generally as 10. The telescope may be mounted in suitable apparatus, such as a tube, not shown. Opposite the telescope is an object 12 having a retroreflector 14, shown as a trihedral or corner cube reflector, mounted thereon. The retroreflector is securely held by bracket 16, and its apex or nodal point 18 is located at the exact point to be centered or aligned. The telescope and object; i.e., the nodal point of the retroreflector, are illustrated in alignment. As is known in the art, a corner cube reflector or trihedral is a triangular right angle pyramid formed by inward facing, reflecting surfaces obtained by cutting off one corner of a cube of appropriate optical material. Alternatively, a catseye reflector consisting of a lens backed by a spherical reflector having a radius equal to the focal length of the lens and centered at the second nodal point of the lens may be used. Either device reflects back in the direction of the source, all light rays incident upon its base regardless of changes in angular orientation over a large range. The reflecting sides of the trihedral may be aluminized or otherwise coated with a reflective material if desired, or the natural internal reflection of the surfaces may suffice.

Lamp 20 provides an illuminating source which is imaged by lens 22 at field stop 26 and then by lens 23 at pyramidal prism 24 so as to fill the nose 30. A mechanical chopper 21, driven by motor 25 acts to interrupt and alternate the source for reasons explained below. Other means may similarly be used to obtain the same result. An alternating power source for the lamp is suitable. Entrance surface 28 of prism 24 is clear as is exit nose 30. Sides 32, 34, and 36 are aluminized or otherwise made reflective as is the side opposite 36, not shown.

Lens 40 is arranged to focus an image of nose portion at apex 18. When the image is exactly centered on the apex, the retroreflector will return the light to the lens along the same path, and the exit slit will thus be imaged back on itself by lens 40. As mentioned above, it is a particular advantage of the trihedral and other retroreflectors that they are completely insensitive to angular misalignment about their nodal points. Thus, the apparatus described in FIG. 1, will register only lateral displacement of the trihedral apex regardless of the orientation of the reflecting sides.

Consider now the effects of transposing object 12 in the direction of arrow 42 in the plane of the paper. The nose image, consisting essentially of a very small spot of light, projected by lens 40 will now fall at a point below apex 18. The image will then be reflected within the trihedral and will reemerge having a point of origin at a place equal in distance from the apex to that of the impinging image and will be situated on a line defined by the impinging image and the apex. Lens 40 will now focus at least a part of the reflected image on the pyramid at a point other than the nose, specifically on side 34. Light will then be reflected to phototube 44 and the resulting signal processed to indicate the displacement. If the object is displaced in a direction opposite to arrow 42, it will be recognized that a similar signal will be produced at phototube 46. Further, the same analysis may be applied to motion perpendicular to the plane of the drawing using sensing apparatus consisting of pyramid side 36 and its opposite side and additional detector components similar to the above.

Modifications may be made in the projecting or sensing apparatus to yield substantially the same results as described above. For example, the illuminating system including the modulated light source and focusing lenses may be replaced by a laser for projecting a beam toward the subject object. Additionally, prism 24 may be replaced by a slit and one or more pair of mirrors. If desired, thin photo-sensors may be mounted directly to receive the returning beam in a position analogous to the prism surfaces.

As mentioned above, lamp 20 is preferably activated by a modulated power source to provide an A.C. light signal for the instrument. Use of an alternating or fluctuating source reduces the effect of noise both internal and external to the phototubes. Odd lamp frequencies may be used to differentiate the information signal from effects generated by stray light from, for example, 60-cycle sources. Detection of the resulting alternating output from phototubes may be accomplished by known techniques. For example, the signals from tubes 44 and 46 may be filtered and amplified by amplifier 31. If the polarity output of one of the tubes is reversed with respect to the other, the signals may be subtracted by amplifier 31 as well. Reference phototube 35 may be used to provide an input to demodulator 37 to produce a resultant D.C. signal of a polarity indicative of the direction of offset of object 12. This signal may then be amplified by anplifier 39 as shown.

The information output of the electronics may further be converted to an analog or digital display and where desired, may be connected directly to a servo-mechanism for automatic alignment control of the subject object.

Referring now to FIG. 2, there is shown an alternative detection system to that described above. As before, lamp 20 illuminates lens 22. Light is projected through nose portion 30 of prism 24 and returned by the retroreflector as in FIG. 1.

Fiber optic light pipes 50 and 52 are arranged to intercept reflected light from sides 32 and 34 at surfaces 54 and 56. The light is emitted substantially undiminished from surfaces 58 and 60 and converted to an electrical signal by phototube 62. A variety of means may be used to differentiate the two beams emanating from the light pipes. The phototube 62 may be time shared by the light transmitted by each of light pipes 50 and 52. For example, the light signal may be mechanically chopped by chopper 64 driven by motor 66. As is obvious, either beam may be so chopped to differentiate over the other, or they may be successively blocked as shown in the Figure.

By successive and alternate chopping, a fluctuating signal is created without modulating the source as shown in FIG. 1. Each of the two light signals created by chopping is then amplified, synchronously demodulated, and polarized by monitoring the chopper to determine which light signal is being processed at a particular moment. The two processed signals may then be subtracted and the resulting plus or minus D.C. signal converted to display format or used to power a servo-mechanism.

The phase referenced chopper position signal on lead 61 may readily be derived by collecting the lead to a commutator coupled to the shaft of motor 66.

As described, this detection system has inherent high stability. The use of one phototube eliminates the differences which may occur in output signals from separate tubes for the same light input. Also eliminated is the necessity of periodically re-calibrating the system to adjust for changes in the lamp output intensity which may effect the null point when two photodetectors are used.

Alternatively, the benefits of a single phototube may be derived by interchanging the position of phototube 62 and lamp 20 as shown in FIG. 3. In this arrangement an alternating light signal may be projected toward the retroreflector by reflection from the sides of prism 24 as fed by light pipes 50 and 52. Suitable means as lenses 70 and 72, may be used to combine the field of illumination of the ends of each pipe such that the projected illumination is in the shape of a fine beam. If the reflector is aligned, light will be reflected back to the opposite side of the prism. If the reflector is misaligned, some light will be reflected through nose portion 30 and imaged on phototube 62. By monitoring the chopper and the output of the phototube, the degree and direction of displacement may be determined by electronics similar to that described above.

The alignment telescope described is capable of great precision. It will be understood; however, that care should be taken to minimize those factors which may effect accuracy. For example, the lenses should be high quality and free from aberrations. The surfaces of the reflector and prism should be regular and optically flat. Ninety-degree angles between the surfaces of the retroreflector should be precise. Precaution should also be taken to rigidly mount and isolate the various components from vibration and thermal affects.

What is claimed is:

1. Apparatus for detecting lateral displacement of an object perpendicular to a selected axis comprising in combination:
   A. retroreflecting means, attached to said object, for reflecting radiation incident thereon along said selected axis back parallel to said selected axis substantially independent of angular misalignments of the retroreflecting means relative to said selected axis;
   B. means for projecting radiation along said axis at said retroreflecting means; and
   C. means for producing an electrical signal indicative of said lateral displacement of the object, including means for sensing a lateral shift, relative to said projected radiation, of the radiation reflected back along said axis.

2. The apparatus of claim 1 wherein said retroreflector means is a trihedral reflector.

3. The apparatus of claim 2 wherein said means for projecting a beam comprises in combination:
   A. a source of illumination;
   B. a limiting aperture illuminated by said illumination source; and
   C. lens means for focusing an image of said aperture at said retroreflecting means, said retroreflecting means reflecting back said image, said lens focusing said image primarily at said source.

4. The apparatus of claim 3 wherein said aperture is formed in a prism having at least one pair of opposed sides, said sides positioned to further reflect said reflected image, and wherein said sensing means comprise photodetectors positioned to receive at least a portion of said reflected image from said prism.

5. The apparatus of claim 4 wherein said prism is a pyramid prism, having two pairs of orthogonally disposed sides.

6. The apparatus of claim 4 including means for modulating said illumination source to produce a fluctuating radiation beam, whereby said photodetectors produce a corresponding fluctuating electrical signal.

7. Apparatus as set forth in claim 1 wherein said retroreflecting means includes a catseye reflector.

8. Apparatus for detecting a lateral displacement of an object perpendicular to a selected axis comprising in combination:
   A. a retroreflector attached to said object, said retroreflector having a nodal point;
   B. light source means for projecting a beam of light along said axis and at said nodal point, said retroreflector positioned to reflect back said beam primarily along said axis and primarily at said source;
   C. reflector means having at least one pair of opposed sides divided by said axis to reflect any portion of said reflected beam falling away from said source when said nodal point is laterally displaced away from said axis;
   D. a photodetector for detecting light and for producing a signal indicative of the detected light;
   E. first and second light pipes disposed to direct said reflected light from each of said opposed sides to said photodetector;
   F. means for time sharing said photodetector between light directed by said first and second light pipes to said photodetector, and for producing a reference signal indicative of the time sharing function;

G. means for producing an electrical signal indicative of said lateral displacement, including means for correlating said signal of said photodetector with said reference signal.

9. Apparatus for detecting lateral displacement perpendicular to a selected axis of an object comprising in combination:
   A. a retroreflector attached to said object, said retroreflector having a nodal point;
   B. a pair of light pipes;
   C. light source means disposed to illuminate one end of each of said pipes;
   D. second reflector means having two opposed sides each positioned to receive illumination emanating from the opposite end of one of said light pipes and further positioned to reflect said light toward said retroreflector and parallel to and displaced from said axis;
   E. interrupter means for alternately interrupting the illumination of each of said pipes such that said retroreflector is alternately illuminated by light reflected from opposite sides of said second reflector;
   F. photodetector means positioned on said axis to detect light reflected from said retroreflector along said axis when any portion of said light reflected from said opposed sides strikes said nodal point; and G. a signal demodulator coupled to said photodetector and said interrupter means to create a separate identifiable electrical signal for each of said pipes.

10. Apparatus for sensing the lateral position of a beam of radiation relative to an axis comprising:
   a. a radiation detector for producing an electrical signal indicative of radiation incident thereon;
   b. first radiation conveying means for conveying radiation incident upon a first lateral side of said axis to said radiation detector;
   c. second radiation conveying means for conveying radiation incident upon a second lateral side of said axis, opposite said first lateral side, to said radiation detector;
   d. means for time sharing said radiation detector between radiation conveyed by said first radiation conveying means and radiation conveyed by said second radiation conveying means, and for producing a reference signal indicative of the time sharing function; and
   e. means for producing an electrical signal indicative of the lateral position of the radiation beam relative to said axis, including means for correlating said electrical signal of said radiation detector with said reference signal.

11. Apparatus as set forth in claim 10 wherein:
   a. said first and second radiation conveying means include a truncated prism positioned on said axis, said truncated prism having first and second reflective lateral surfaces;
   b. said first radiation conveying means includes a first light pipe means positioned to convey radiation reflected from said first lateral face of said truncated prism to said detector; and
   c. said second radiation conveying means includes a second light pipe means positioned to convey radiation reflected from said second lateral face of said truncated prism to detector.

12. Apparatus as set forth in claim 11 wherein:
   a. said means for time sharing includes means, interposed between said first and second light pipes and said radiation detector, for sequentially allowing radiation from said first and second light pipes to be received by said detector, and said reference signal is indicative of which of said light pipes said detector is receiving radiation from at particular times; and
   b. said means for correlating includes a synchroneous demodulation means.

13. Apparatus as set forth in claim 10 wherein:
   a. said means for time sharing includes means, interposed between said first and second radiation conveying means and said detector, for sequentially allowing radiation from said first and second radiation conveying means to be received by said detector, and said reference signal is indicative of which of said first or second radiation conveying means said detector is receiving radiation from at particular times; and
   b. said means for correlating includes a synchronous demodulation means.

* * * * *